May 26, 1970 S. LATTUCA 3,513,895
PLASTIC BASKET
Filed July 17, 1968
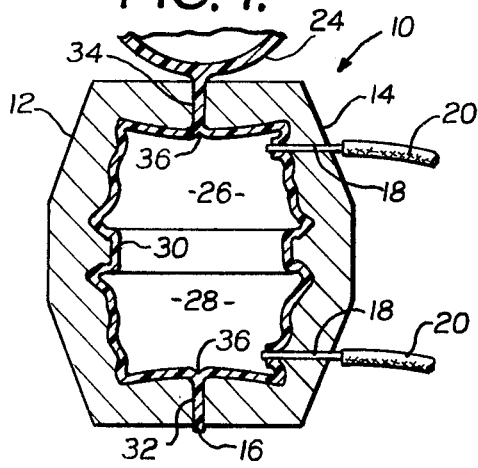
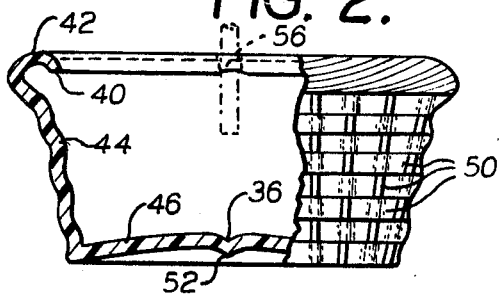
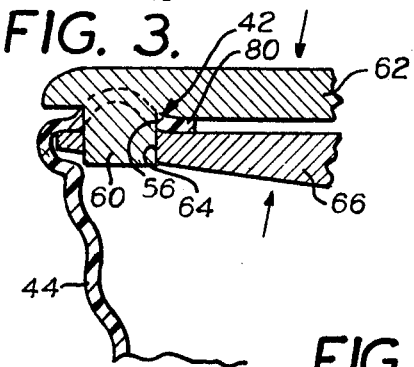
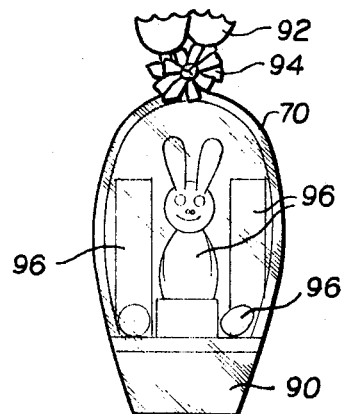
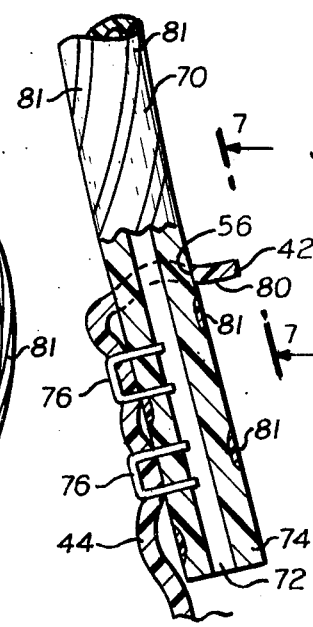
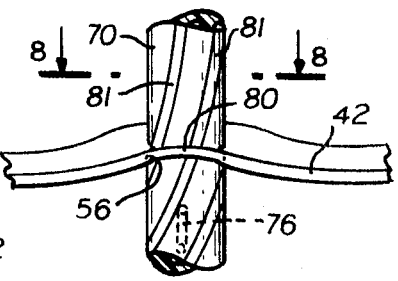
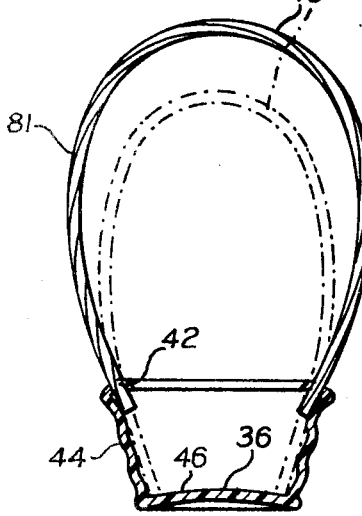
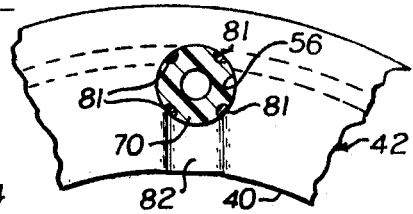
INVENTOR
Sam Lattuca
BY Munroe, Neill,
Schotler & Wistrom
ATTORNEYS.

United States Patent Office 3,513,895
Patented May 26, 1970

3,513,895
PLASTIC BASKET
Sam Lattuca, 218 Atlantic Ave., Hempstead, N.Y. 11550
Filed July 17, 1968, Ser. No. 745,426
Int. Cl. B65d 25/28
U.S. Cl. 150—48                                    5 Claims

ABSTRACT OF THE DISCLOSURE

Plastic baskets are made in accordance with this invention by blow-molding a basket having a bottom, side walls and an inwardly extending top lip with contours that simulate a woven basket. Openings are punched through the lip at diametrically opposite locations in the lip radially spaced from both the inner and outer edges of the lip; and a stiffly flexible plastic tube is bent to a generally horseshoe shape with its opposite end portions of a cross section to fit snugly through the openings. Unclinched staples driven through the side walls from the outside, intersecting the wall of the plastic handle, hold it against upward and downward movement and to cooperate with the top lip in holding the handle against sidewise movement. The preferred method molds two baskets simultaneously and cuts them apart after molding. The product obtained has a firmly upstanding handle that cooperates with a plastic wrapping to hold confections and decorative novelties in an assembled display in a space circumscribed by the horse-shoe-shaped handle.

SUMMARY OF THE INVENTION

This invention includes an improved method of making plastic baskets with sides that diverge as they extend upwardly, and each basket has a generally horseshoe-shaped handle that is relatively stiff and that remains in upright position extending for a substantial distance above the basket.

The invention will be described as applied to a round basket; but it will be understood that the basket can be oblong, oval, square, polygonal or any shape. An important consideration is that it be economical to manufacture so that it can compete commercially with the less sanitary imported woven baskets made of reeds and various other vegetable fibres.

One feature of the invention relates to the blowing of two baskets at the same time in a common mold and with a connecting section that can be cut apart and then trimmed off. An inwardly extending top lip of the basket is substantially wider than the thickness of the handle; and openings are formed in the handle, preferably by punching, of a diameter to receive the end portions of the handle with a snug fit.

The lip and openings are oriented so that the end portions of the handle extend along the inside surface of the side walls of the basket, and the handle can be pushed down for different distances into the basket, before fastening, to change the length to which the handle extends above the top lip of the basket.

The handle is formed from a stiffly flexible plastic tube having a thick side wall so that staples driven from the outside into the tubular handle pierces a substantial thickness of plastic in the handle and hold the handle firmly without requiring that the staples be clinched. Thus it is not necessary to have the staples extend all the way through the handle and they are not visible from inside the basket.

Because of the stiffness of the basket, resulting from the corrugations produced by the contours that simulate a basket weave, and the stiffness and strength of the handle support, the basket is especially suitable for use as an "Easter basket" filled with confections and novelty items within the space circumscribed by the handle and wrapped with transparent film which extends under the bottom of the basket and upward to a location at the top of the handle where the wrapping is gathered and attached to a bow whereby the contents of the basket are completely enclosed.

Other objects, features and advantages of the invention will appear or be pointed out as the description proceeds.

BRIEF DESCRIPTION OF THE DRAWINGS

In the drawing, forming a part hereof, in which like reference characters indicate corresponding parts in all the views:

FIG. 1 is a diagrammatic view showing the way in which plastic baskets are made by blow molding in accordance with this invention;

FIG. 2 is an enlarged view, mostly broken away and in section, of one of the baskets made by the method illustrated in FIG. 1;

FIG. 3 is a greatly enlarged fragmentary view of the upper portion of a side wall and the lip of the basket shown in FIG. 2, and illustrating the manner of forming an opening through the lip;

FIG. 4 is a view, on a reduced scale, showing the basket of FIG. 2 with a handle attached and with the basket filled and wrapped and in condition in which it is displayed for sale to customers;

FIG. 5 is a sectional view, on a reduced scale, showing the basket of FIG. 2 with the handle attached and illustrating the adjustability of the handle;

FIG. 6 is a greatly enlarged fragmentary view showing the manner in which the handle is attached to the basket of FIG. 5;

FIG. 7 is a fragmentary detail view of the construction shown in FIG. 6, the view being taken at the plane 7—7 of FIG. 6; and FIG. 8 is a sectional view on the plane 8—8 of FIG. 7.

DESCRIPTION OF THE PREFERRED EMBODIMENT

FIG. 1 shows a mold 10 consisting of two halves 12 and 14 which meet at a parting line 16. The mold 10 is a blow mold which has blow pins 18 supplied with air through tubing 20.

The mold 10 and its operation are conventional and well understood in the art; the only novelty of the mold being the inside contour for making plastic baskets in accordance with this invention. Plastic 24, which is introduced into the mold in the conventional manner, is blown against the inside surfaces of the mold, and these surfaces are shaped to produce two plastic baskets 26 and 28 which are joined together in the mold by a plastic connecting portion 30.

After blowing the baskets 26 and 28, the mold 10 is opened and the baskets are removed. A fin 32 is cut from the bottom of the basket 28 and another fin 34, at the supply end of the mold, is cut from the basket 26. These fins 32 and 34 are at the parting line of the mold and in the blowing of the baskets 26 and 28, there is a depression 36 extending across the bottoms of the baskets at the parting line.

The baskets 26 and 28 are then cut apart by cutting through the plastic connector 30. The portion of the connector 30 which remains attached to each of the baskets 26 and 28 is then trimmed off to form an inner edge 40 (FIG. 2) along an inwardly extending lip 42 at the top of the side walls 44 of the basket.

The side walls 44 extend upwardly from a bottom 46; and the inside surface of the mold is shaped to give the side walls 44 and the bottom 46 the contour of a basket weave 50.

The top lip 42 is formed with a contour that simulates a finish weave at the top of the basket. Although the top lip 42, side walls 44 and bottom 46 have the appearance of being woven, they are actually molded as impervious plastic walls and they are of substantially the same thickness at all locations of their extent. The bottom 46 is dished upwardly so that its outer circumference rests on a supporting surface for greater stability in accordance with the usual construction of a basket. This locates any flash 52, which may be left after cutting off the fin 32, above the circumferential edge of the bottom 46.

The top lip 42 extends radially inward and then extends downward to the edge 40. Openings 56 are formed in the top lip 42 for receiving a handle for the basket. Two openings 56 are formed through the lip 42 at diametrically opposite locations in the lip and preferably immediately above the depression 36 on the parting line.

FIG. 3 shows the preferred method of forming the openings 56. A punch 60 on a handle 62 pierces the lip 42 and forces material from the lip through an opening 64 in an anvil portion of another handle 66 of a piercing tool. Each opening 56 is formed through the lip 42 at a location spaced from both the inner and outer edges of the lip. Thus there is plastic material of the lip 42 beyond the edges of the opening 56 providing mechanical strength for preventing a handle 70 (FIGS. 4–8) from tearing the lip 42 when the handle is subjected to lateral force.

The handle 70 fits through the opening 56 and the diameter of the handle 70 is substantially equal to that of the opening 56 so that the handle fits through the opening with a snug fit. The handle 70 is preferably a plastic tube having a center opening 72 (FIG. 6) and a thick side wall 74 which occupies most of the radius of the plastic tube.

The handle 70 extends along the inside surface of the side wall 44 and is connected to the side wall 44 by staples 76. There are preferably two such staples located below the lip 42 and in position to distribute the strain of the connection along the lower portion of the handle 70, but without having either staple so close to the bottom of the handle that the strength of the connection will be impaired.

One of the advantages of the thick wall 74 is that the staples can be driven through the side wall 44 from the outside and will pierce a substantial thickness of plastic in the handle 70 so as to hold the staples firmly in the plastic even though the staples are not clinched. Long, clinched staples extending all the way through the handle 70 would be unsightly on the inside of the basket.

In the preferred construction illustrated in FIG. 6, the staples 76 prevent the handle 70 from moving upwardly or downwardly through the opening 56 and they anchor the handle 70 to the side wall of the basket, but most of the strength of the construction for holding the handle in a vertical position is provided by the edges of the opening 56 bearing against the side of the handle 70. The curved shape of the top lip 42, including the corrugations formed by the contours which simulate the weaving, give the top lip 42 substantial rigidity against lateral displacement. The sides and bottom of the basket are also given added stiffness by virtue of the corrugations provided by the simulated basket weave. Even if the handle 70 is held by only one staple in FIG. 7, the handle is kept in a rigid upright position by the edges of the opening 56.

In order to permit the handle 70 to extend generally parallel to the side wall 44, as shown in FIG. 6, the top lip 42 has to be distorted in the vicinity of the opening 56. This is preferably done by the pressure of the tool which punches the opening 56, as shown in FIG. 3. The handle portions 62 and 66 bear against the lip 42 to provide a flattened portion 80, best shown in FIG. 7. The lip 42 is also bent upwardly at this flattened portion 80, as will be evident by comparing FIGS. 2 and 6. By thus bending the lip 42 upwardly at its inner edge, the opening 56 is oriented to bring its axis into a position generally parallel to the inside of the side wall 44 so that the handle 70 can contact with the side wall for a substantial distance.

For decorative effect, spiral inserts 81 of contrasting color are applied to the handle 70 with a pitch greater than the width of the insert.

The handle 70 is made of stiffly flexible plastic and bends into a generally horseshoe shape, as shown in FIGS. 4 and 5, when its end portions are inserted through the openings in the top lip 42 of the basket. The extent to which the handle 70 extends above the top of the basket depends upon the length of the handle and also upon the extent to which the end portions of the handle are pushed down into the basket. FIG. 5 shows the handle 70, in full lines, connected to the sides 44 with only a short portion of the handle extending into the basket, as in FIG. 6. FIG. 5 also shows, in dot-and-dash lines, the position of the handle 70 as its end portions are pushed all the way to the bottom 46 of the basket before attaching the handle to the sides 44. When the handle 70 is pushed down to the bottom 46, the ends of the handle engage the recess 36 and this provides additional bracing for holding the handle against tilting. This advantage can be gained only where the handle openings through the lip 42 are located immediately above the depression 36. Thus with handles of standardized length there is a choice, within a range, of handle limit and shape above the basket which can be controlled in accordance with the purpose for which the basket is to be used. The spacing of the openings 56 from the inner and outer edges of the lip 42 depend upon the diameter of the handle 70 and upon the radial extent of the lip 42; but the handle diameter and radial extent of the lip 42 are preferably coordinated so that the opening 56 can be spaced from the inner edge 40 by a distance not less than the radius of the handle 70 and can be spaced from the outer circumference of the basket by a distance greater than the thickness of the side walls of the basket.

FIG. 4 shows the finished basket with a wrapping of transparent plastic film 90 which extends under the bottom 46 and up around the handle 70 to a location where the plastic film 90 is brought together in gathers 92 and fastened at a decorative bow 94. The basket is filled with confections and novelties indicated generally by the reference characters 96 and these confections and novelties, such as commonly used to fill Easter baskets, are held in place by the wrapping 90 which is, in turn, held firmly against displacement by the handle 70.

The preferred embodiment of the invention has been illustrated and described, and is defined in the appended claims.

What is claimed is:

1. A plastic basket comprising a bottom, side walls that flare outwardly as they extend upward from the bottom, and a top lip extending inward from the upper end of the side walls for a distance substantially greater than the thickness of the side walls, a stiffly flexible handle forming a bow above the basket and having sections that extend through openings in the top lip at locations spaced inward from both radial limits of the top lip, the bottom and sides having a surface contour that simulates a basket weave, and the top lip having a surface with a contour that simulates a finish weave for the upper end of a basket but the actual thickness of the bottom, the sides and top lip being substantially equal to one another, the handle contacting with the inside surface of the side walls below the lip, and means connecting the handle with the side walls.

2. The plastic basket described in claim 1 characterized by the handle being a plastic tube with a thick wall equal to most of the radius of the tube, and the means connecting the handle with the side walls being metal fastening that extend through the side walls and into the wall of the tube, but that extend only part way through the diameter of the tube.

3. The plasic basket described in claim 2 characterized by the tube being of composite construction and having a spiral insert of different color from the other material of which the tube is made, the spiral having a pitch substantially greater than the width of the insert to produce a decorative striped handle, the spiral insert extending through the openings in the lip and to the ends of the tube within the basket.

4. The plastic basket described in claim 1 characterized by the means connecting the handle to the side walls being unclinched staples that prevent up-and-down movement and sliding of the handle with respect to the basket, the handle fitting snugly through the openings in the top lip and being held by the sides of those openings against inward, outward and tangential movement with respect to the basket.

5. The plastic basket described in claim 1 characterized by the top lip extending generally horizontally inward with its inner edge projecting downward except in the vicinity of the handle-receiving openings in the lip, the top lip extending somewhat upward with respect to the rest of the lip in said vicinity to orient the openings so that the handle can extend generally straight all the way to the bottom of the basket whereby the spacing of the handle ends from the bottom can be adjusted before connecting the handle to the basket to change the length of handle that projects above the top lip of the basket.

References Cited

UNITED STATES PATENTS

| | | |
|---|---|---|
| 1,310,356 | 7/1919 | Loewenberg _____ 217—125 |
| 1,846,542 | 2/1932 | Budd. |
| 2,028,085 | 1/1936 | Brunt. |
| 2,057,002 | 10/1936 | Bomberger. |
| 2,979,844 | 4/1961 | Lattuca _____ 150—48 |
| 3,302,679 | 2/1967 | Padovani _____ 150—48 |

DONALD F. NORTON, Primary Examiner

U.S. Cl. X.R.

220—94